(12) United States Patent
Graf et al.

(10) Patent No.: US 6,188,945 B1
(45) Date of Patent: Feb. 13, 2001

(54) DRIVE TRAIN CONTROL FOR A MOTOR VEHICLE

(75) Inventors: Friedrich Graf, Regensburg; Gregor Probst, Landshut; Roman Strasser, Burgkirchen, all of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 08/937,253

(22) Filed: Sep. 12, 1997

(30) Foreign Application Priority Data

Sep. 12, 1996 (DE) .............................. 196 37 210

(51) Int. Cl.$^7$ .............................. B60K 41/04; F02D 28/00
(52) U.S. Cl. .............................. 701/58; 701/54; 180/65.2
(58) Field of Search .................. 701/51, 58, 60, 701/61, 54, 53, 48, 57; 180/65.2; 477/20, 107, 109, 110

(56) References Cited

U.S. PATENT DOCUMENTS

| | | | |
|---|---|---|---|
| 4,853,720 | 8/1989 | Onari et al. | 364/431.07 |
| 4,866,622 | * 9/1989 | Dreher et al. | 701/102 |
| 5,012,418 | 4/1991 | Petzoid . | |
| 5,113,721 | * 5/1992 | Polly | 477/80 |
| 5,150,635 | 9/1992 | Minowa et al. | 74/866 |
| 5,351,776 | 10/1994 | Keller et al. | 180/79.1 |
| 5,450,324 | 9/1995 | Cikanek | 364/426.02 |
| 5,508,923 | * 4/1996 | Ibamoto et al. | 701/70 |
| 5,521,823 | 5/1996 | Akita et al. | 364/424.05 |

FOREIGN PATENT DOCUMENTS

| | | |
|---|---|---|
| 4039005A1 | 6/1991 | (DE) . |
| 4401416A1 | 7/1995 | (DE) . |
| 0388107 | 9/1990 | (EP) . |
| 0576703A1 | 1/1994 | (EP) . |
| 2 031 822 | 4/1980 | (GB) . |
| 2240827 | 8/1991 | (GB) . |
| 2255057 | 10/1992 | (GB) . |

OTHER PUBLICATIONS

International Applicatio WO 90/03898 (Lang), dated Apr. 19, 1990.

"Systemvernetzung im Automobil", R. Leonhard, Stuttgart, Feinwerkstechnik im Fahrzeugbau, München, 1993, pp. 87–90.

"Fahrzeugregelung und regelungstechnische Komponentenabstimmung", U. Zoelch et al., VDM Berichte No. 1225, 1995, pp. 281–297, pertains to motor vehicle control and closed–loop/open–loop control adjustment.

\* cited by examiner

*Primary Examiner*—Michael J. Zanelli
(74) *Attorney, Agent, or Firm*—Herbert L. Lerner; Laurence A. Greenberg; Werner H. Stemer

(57) ABSTRACT

An integrated drive train control system for a motor vehicle interprets the position of the accelerator pedal and the brake pedal as a wheel torque desired by the driver. A calculating device receives signals representing the positions of the accelerator pedal and the brake pedal. Central control parameters for the drive sources and for the decelerating units of the drive train are generated on the basis of the position signals. A classification device evaluates the sensor signals from the drive train and classifies operating parameters of the motor vehicle.

8 Claims, 5 Drawing Sheets

DRIVE TRAIN CONTROL FOR A MOTOR VEHICLE

BACKGROUND OF THE INVENTION

Field of the Invention

The invention relates to a drive train control system for a motor vehicle, by which the position of the accelerator pedal is interpreted as a wheel torque or transmission output torque desired by the driver and used for calculating desired values for the engine and transmission of the motor vehicle.

Prior art control systems for the engine, for the transmission, and for the secondary assemblies of a motor vehicle operate largely independently; that is, they establish the operating point and operating mode of the controlled assembly largely independently of one another. Means are also available for communication among the various components of the drive train of a motor vehicle, for instance in the form of a CAN bus or the like, but these means are predominantly used only for exchanging sensor data in the course of multiple utilization. Moreover, the control systems affect one another by means of communication in certain operations, for instance to make for smoother shifting by reducing the engine torque upon a change of transmission ratio in the transmission.

Other examples are engine drag torque control during braking and braking intervention or torque reduction if drive slip arises in the traction control context. A system for linking together systems in the automobile has become known heretofore that seeks an integrated drive train control system for a motor vehicle by means of which the position of the accelerator pedal is interpreted as a wheel torque desired by the driver and used for calculating desired values for the engine and transmission of the motor vehicle (F & M 101 (1993) 3, pp. 87–90). The goal of the overriding optimization, proposed in this publication, of the parts of the system embodied by the engine control unit, electronic accelerator pedal and transmission control unit, is to reduce fuel consumption and improve the drivability, in particular with regard to the spontaneous reaction to movements of the accelerator pedal.

SUMMARY OF THE INVENTION

It is accordingly an object of the invention to provide a drive train control for a motor vehicle, which overcomes the above-mentioned disadvantages of the heretofore-known devices and methods of this general type and which globally improves the operation of the motor vehicle. Emissions (hydrocarbons, nitrogen oxides, etc.) are to be minimized by centrally defining a strategy for the engine control, engine performance adjuster and transmission control, that minimizes the emission of pollutants, especially in urban areas. The central strategy may also have as its goal a performance-oriented mode of the motor vehicle. In such a strategy, all the decentralized function units are adjusted in such a way that the best possible acceleration and rapid response of the drive to driver demands are available. Such a mode is required in a sporty driving mode and in driving uphill.

With the foregoing and other objects in view there is provided, in accordance with the invention, a drive train control system for a motor vehicle having an engine, a transmission, wheels, an accelerator pedal, and a brake pedal, the drive train control system comprising:

a calculating device connected to receive position signals representing a position of the accelerator pedal and a position of the brake pedal, the calculating device interpreting the position of the accelerator pedal as a wheel torque or transmission output torque desired by a driver of the motor vehicle and calculating therefrom setpoint values for the engine and the transmission of the motor vehicle;

a classification device connected to receive sensor signals from the drive train, the classification device being programmed to evaluate the sensor signals and to classify operating parameters of the motor vehicle; and the calculating device combining the position signals and the classified operating parameters and generating therefrom central control parameters for drive sources and decelerating units of the drive train of the motor vehicle.

In accordance with an added feature of the invention, the calculating device is programmed to adjust a transmission ratio in the transmission.

In accordance with an additional feature of the invention, the calculating device adjusts the engine output torque.

In accordance with another feature of the invention, the calculating device defines a type of drive source of the motor vehicle. Where the engine is a hybrid drive, the calculating device defines and adjusts individual operating points of the hybrid drive.

In accordance with a further feature of the invention, the calculating device adjusts the engine torque as a function of the transmission ratio of the hybrid drive.

In accordance with again a further feature of the invention, the system further includes:

a selection circuit connected to receive output signals of the classification circuit, the selection circuit selecting a driving strategy based on the output signals of the classification circuit; and decentralized control units connected to receive output signals of the calculating device and of the selection circuit, the decentralized control units generating control signals for the engine, the transmission and a brake system of the motor vehicle.

In accordance with a concomitant feature of the invention, a data exchange among the control units is effected in a torque-based manner.

Other features which are considered as characteristic for the invention are set forth in the appended claims.

Although the invention is illustrated and described herein as embodied in a drive train control system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
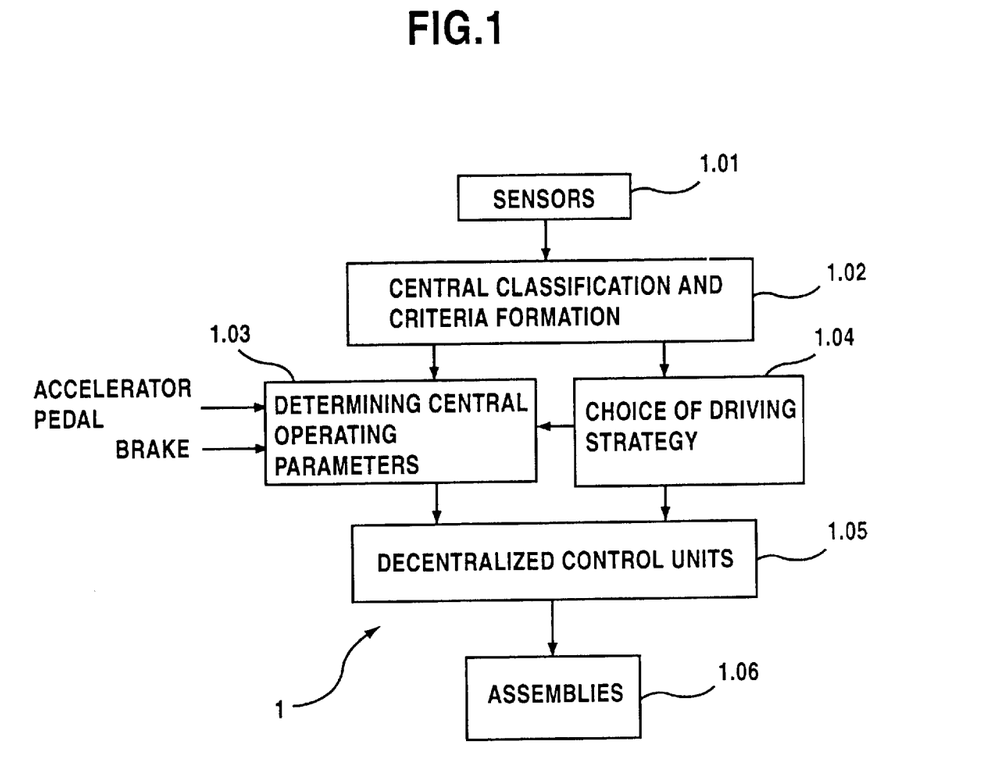
FIG. 1 is a block diagram showing the hierarchical structure or architecture of an integrated drive train control system according to the invention.

Referring now to the figures of the drawing in detail and first, particularly, to FIG. 1 thereof, there is seen an integrated drive train control system 1. For the sake of better readability, the terms "circuit" or "block" will often be omitted for the individual circuit or program components (for example, selector rather than selection circuit).

The components are as follows: sensors 1.01, combined symbolically into one block; a central unit for classification and criteria formation 1.02; a central unit for determining operating parameters 1.03, which receives the signals from the accelerator pedal and the brake pedal of the motor vehicle; a driving strategy selector 1.04; decentralized control units 1.05 combined in a block; and the assemblies 1.06 of the drive train to be controlled, for example the engine, the transmission, and the brakes of the motor vehicle.

The function and the mode of operation of the components of FIG. 1 will now be described in conjunction with the description of the other drawing figures.

Figure 2:
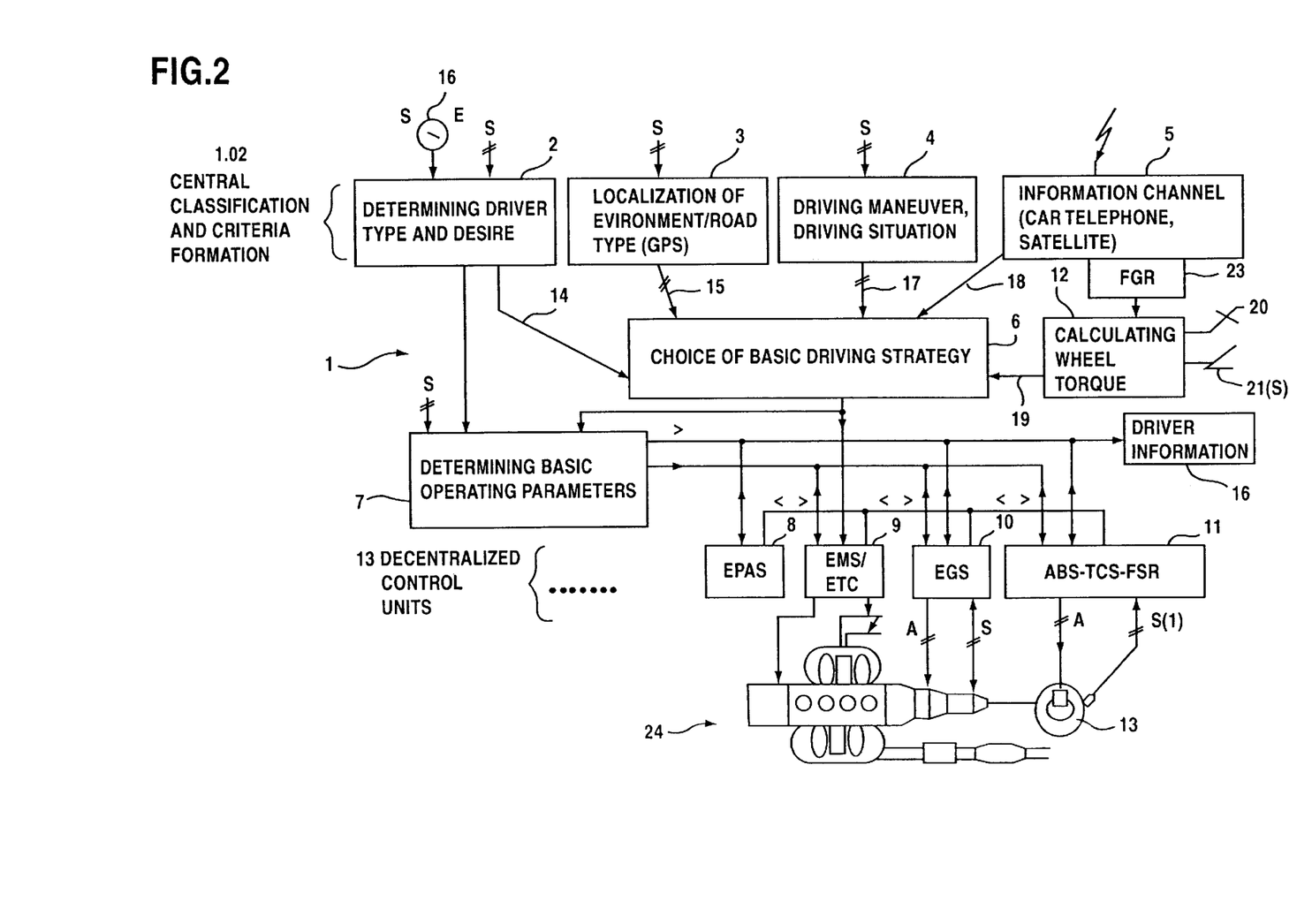
FIG. 2 is a diagrammatic/schematic view of an integrated drive train control system according to the invention.

The integrated drive train control system 1 is shown in more detail in FIG. 2. It has the following components in the central classification and criteria formation block 1.02: a driver type and driver demand determining circuit 2, an environment type and road type localization unit 3 (for example via GPS), a driving maneuver and driving situation detection unit 4, and an information channel 5 (for instance, a car phone or a satellite receiver). The circuits 2–5 and other circuit components to be described below in the drive train control system 1 are supplied with the signals from various sensors in the motor vehicle, here symbolically represented by the letter S, over suitable signals lines. The signal lines are shown in the drawing as multiple lines but may also be embodied as a data bus (such as a CAN bus).

A basic driving strategy selector 6, via lines 14–18, receives output signals from the aforementioned circuits 2–5. Via a line 19, it receives the output signal of a wheel torque calculation device 12, which in turn receives signals from a brake pedal 20 and an accelerator pedal or gas pedal 21.

Output signals from the basic driving strategy selector 6 are delivered to a basic operating parameters determining unit 7 and to an electronic engine controller and engine performance adjusting unit 9. (The term "unit" as used herein does not necessarily require a separate component, but it also encompasses functional subroutines and circuit components.) The output signals of the unit 7 proceed to a driver information block or display 16, an electrical power steering system (EPAS) 8, an electronic engine control system (EMS/ETC) 9, an electronic transmission control (EGS) 10, and a brake controller 11, which can include an ABS system, a traction control system TCS, and a driving stability control system FSR.

The basic operating parameters determining unit (or block) 7 now, in accordance with the strategy specification from block 6, carries out a coordinated calculation of the central operating parameters of the entire drive train. In the block 6, the transmission ratios and the desired engine torque are for instance defined, but also the drive type and in the case of a hybrid drive its individual operating points as well. This enables a substantially more comprehensive control of the engine and transmission than before. Thus the engine torque can be adjusted as a function of the transmission ratio. This increases the drivability of the motor vehicle, since the driver on upshifting no longer has to compensate for a loss of output torque. In addition, and quite importantly, pollutant emissions can be effectively reduced as well (as will be explained later herein).

The coordinated definition of the operating parameters of the engine and transmission takes place not only in a steady state, i.e., not only at a constant wheel torque demand from block 12. Information on dynamic events, such as cornering or a transition to the overrunning mode (the vehicle speed is reduced), is taken into account by the block 7 as well, in order to coordinate the function units 8–11 that follow it. For instance, in the case of overrunning, the current transmission ratio can be retained and at the same time the overrunning shutoff can be activated. In cornering on extremely sharp curves, it is appropriate, in order to maintain driving stability, that the transmission ratio be fixed (see EGS) and that load changes in the drive train be damped or made to proceed more slowly (see EMS/ETC).

The centralization along the lines of drive mode management and emissions management should be done only as much as necessary, however (strategy specification and/or delegation). All the other functions (such as functions for driving stability) proceed as much as possible at the level of the decentralized control units.

The control circuits or units 8–11 produce adjusting signals with which the individual assemblies or components of the drive train 24 of the motor vehicle are controlled, that is, the engine via its throttle valve, the transmission, and the brakes of the motor vehicle. The adjusting signals pass over lines A from the circuits 9–11 to the assemblies of the drive train; sensor signals S are carried over corresponding lines to the aforementioned circuits. The control circuits or units 8–11 may, however, also be put together as so-called on-site units with whichever assembly is to be controlled, or can be integrated with it. For instance, it is appropriate for the controller 11, especially in the case of an electrical brake actuator, to be combined with the brake actuator. This changes nothing in terms of the control function.

The individual components of the drive train itself are shown toward the bottom of FIG. 2 and will not be explained further here because they are well known. In the case of a hybrid drive—that is, an internal combustion engine combined with an electric motor—the former is coupled to an electric motor and a generator G. One such hybrid drive is known, for instance, from VDI-Bericht [VDI Report; VDI= Association of German Engineers] No. 1225, 1995, pp. 281, 297.

Examples of a global or combined drive train control system according to the invention are as follows:

1. A minimized emissions mode (HC, $NO_x$):

The basic driving strategy selector 6 defines the operating mode of the entire drive train for minimized pollutant emissions.

From this specification, a central "decider", that is, the basic driving strategy selector 6, defines the essential operating parameters of circuits 9, 10 (EMS, ETC, EGS) such that pollutant emissions are minimized (for instance in urban areas). This specification can be converted by the following function units as follows:

ETC (electronic engine performance controller): load changes of the engine are damped (demanded by unit 12), or the operating range is restricted. By avoiding non-steady-state events, closed- and open-looped control systems that seek a reduction in emissions can operate without error. Operating ranges with quantitatively or qualitatively undesired emissions composition are avoided.

EMS (electronic engine control): activation of a low-emissions mode, for instance in the engine by reducing fuel enrichment upon acceleration, or changing the drive type (for instance to electric motor, hydrogen drive)

EGS (electronic transmission control): brings about the most steady-state operation mode possible for the engine in a range with minimum emissions, for instance with CVT or in a many-geared transmission;

adaptation if there is a change of drive type (such as electric motor, hydrogen drive, coordinated by unit 7): particularly in this function, good cooperation of engine and transmission is important, because the driver demand with regard to acceleration and speed allows more combinations of resultant engine torque and transmission ratio. An adapted course of the change over time in the two controlling variables is also necessary.

2. A performance-oriented mode.

Analogously to the minimized emissions mode, all the decentralized function units are adjusted such that the best possible acceleration and rapid response of the drive train to driver demands (unrestricted drive type) are available. This is necessary in the sporty driving mode or in driving uphill.

FIG. 1 shows the architecture of such a functional layout.

However, decisions at lower control levels that affect higher specifications are signaled as much as necessary to the higher control levels. But this will also be explained in conjunction with FIG. 2, whose function will now be explained in detail.

The block (or circuit) 2 serves to determine the driver type, that is, to make a classification expressing a distinction between performance-oriented and economy modes. One example of such a function is described in European Patent Disclosure EP 0 576 703 A1. A signal characterizing the driving style of the driver is delivered to a basic driving strategy selector 6 via a line 14.

Block 3 ascertains the road type (city/expressway/highway/country road), but also can determine the general degree of air pollution, for instance, via additional sensors. If the specific location of the vehicle is known by GPS (global positioning system) in conjunction with a digital card (on CD ROM), then this information on the local air pollution can be made available to the block 6.

A detection, performed in block 4, of individual driving maneuvers, such as cornering, an uphill grade, drive and brake slip, and information on longitudinal and transverse stability can also be utilized to ascertain the driving strategy choice. This information can also be made available to block 7, so that by way of the medium-term operating strategy it is also possible in the short term to achieve a suitable operating mode of the drive train. This information for blocks 6 and 7 can also originate in decentralized control units (for instance, information on the dynamic driving stability from the ABS/TCS/FSR control unit 11) or from the information channel 5. Block 5 furnishes information that is supplied by a central "control point", such as a traffic monitoring agency. This makes regional, centralized control of low-emissions operating modes possible.

Block 6 serves to ascertain the choice of basic driving strategy for the following unit 7, which in turn in coordinated fashion ascertains the central operating parameters for the decentralized control units. The information on the lines 14, 15, 17 and 18 is compared with a fixed set of rules. This is accomplished with a fuzzy system, mathematically formulated algorithms, or a neural network.

The sensors S furnish necessary signals both for forming the classification and criteria in the top most layer of the drive train control system 1, that is, in the units 2–5, and for the decentralized control units for the individual assemblies. The location of the sensors with regard to the function blocks plays a subsidiary role, as long as communications between the sensor signal processing in the respective control unit (ECU) and the information sink are assured. Nor does it matter, with regard to the functional architecture, which function units are physically located in which ECU and combined with it. Thus it is entirely possible to integrate the driver type and driver demand determining unit in the transmission control system (EGS) 10, while the environmental and road type classification can be accommodated in block 11 (regulation of longitudinal and transverse dynamics).

A central computer can also contain the units 12, 6, 7. What is essential is the virtual architecture, as shown in FIG. 2, for attaining overall improved function. An important role is played here by the communications between the physical units, which are expediently embodied in the form of fast serial bus communication (for instance via a CAN bus).

The specifications by the driver expressed through the accelerator pedal or gas pedal are converted in block 12 into a desired wheel torque specification, that is, the torque that is to be transmitted from the drive wheels to the roadway. The influence of environmentally dictated factors, such as additional driving resistance (mountain driving, vehicle load), are not meant to be taken into account here, so as not to alienate the driver from the physical reality.

Block 12 is shown separately in FIG. 2, but it can also be accommodated physically in the decentralized control units 8–11 or 16 (for instance in EMS/ETC). The same is true for locks 1–7. The signal on line 19 can be output as a wheel torque desired by the driver, or as a desired circumferential wheel force or a desired transmission output torque. By means of continuous information via the brake pedal 20, it is also possible to specify negative desired wheel torques or desired circumferential wheel forces. Hence integrated management of driving units (such as the engine, electric motor, rotating flywheel) or decelerating units that absorb energy (such as the service brake, generator, or a flywheel not in motion) are possible. As an alternative to driver specification of the wheel torque, this wheel torque can also be specified by a cruise control 23 (FGR for short).

The information channels between block 7 ("basic operating parameter determination") and the units 9, 10 and 11 can be used bidirectionally. The reason for this is the necessity, in the calculation of the basic operating parameters, of using not only such external conditions as driver type, environment and driving maneuvers as the basis but also of taking into account internal specified operating states of the controlled units in the drive train. For instance, it is important after a cold start to run the engine at elevated rpm in order to reinforce the warmup of the catalytic converter. Moreover, additional heat sources (such as an electrically heated catalytic converter) represent an additional load on the engine output. Adjusting the ignition timing toward "late" after a cold start (optionally blowing in secondary air) for the same purpose changes the characteristics of the drive train and must be taken into account by the unit 7 (for instance, by postponing gear shifting points to higher engine rpm levels).

A particular operating state in the transmission can likewise affect the calculation of the transmission ratio (such as cold transmission fluid when the torque converter lock up is turned on; at excess transmission temperature, it is appropriate to shift engine rpm levels to ranges that increase the volumetric throughput of the oil pump of the transmission through the oil cooler). Other interventions in the engine torque, such as increasing it in order to compensate for the loss of torque by the air conditioning compressor or losses of efficiency in the transmission (CVT: adjusting the transmission ratio dictates a greater pumping power), take place on the control level represented by blocks 8–11, unless they also have to be supported by other provisions in block 7.

By means of the drive train control system of the invention, it is thus possible not only for the gear shifting behavior, when driving uphill and downhill or if performance demands oriented to driving style and driving situation are made, but also the control of the entire drive train, including the drive sources, to be subjected to different criteria and adapted to them.

For instance it may be appropriate and necessary, in critical situations and driving maneuvers, to adapt the current transmission ratio (keep it unchanged) in a situation-oriented way, specifically regardless of whatever general strategy has just been set. Such dynamic corrections are functionally combined, in the control concept of the invention, with the control of the engine (one example is the coordinated lock up of a gear and activation of the engine overrunning shutoff).

It is appropriate not yet to include engine-specific parameters in block 12 (wheel torque calculation), because after all, in a hybrid drive, for instance, the choice of driving type is not yet fixed at this decision level. However, it is useful to include such conditions as traction conditions (winter driving, a gravel road) and above all in highly motorized vehicles preventively to reduce the sensitivity of the system somewhat (to generate less wheel torque with the accelerator pedal in the same position). In general, the conversion of the accelerator pedal position into a wheel torque can be done with a fuzzy system, which combines the multiple dependencies into a desired wheel torque.

The advantages of the invention also reside in an integrated wheel torque management, which processes the wheel torque as a negative value as well and that influences both drive sources and the units that slow down the vehicle. It is especially simple to couple it with brake systems that have electrical brake actuation ("brake by wire").

In block 7, not only the transmission ratios and the respective desired engine torque but also the driving type and the individual operating points thereof are defined. Not only is a strictly wheel torque-oriented mode by driver specification possible, but by centralized specifications in terms of pollutant emissions, the real wheel torque can also be varied or limited. However, such interventions must be displayed to the driver through block 16 and must be done as much as possible without restrictions to drive mode selection.

Blocks 2–7 and 12–16 may be accommodated in independent physical units (control units) or can be integrated with the units 8–11. This flexibility is yet another advantage of the invention.

The data exchange among the individual control units is done in torque-based fashion. The term "torque-based" is understood as follows: If the transmission demands a reduction in engine torque, for instance, then it forwards a variable to the engine controller, which represents the desired torque or in other words the desired engine torque and does not for instance demand an ignition angle reduction by 5%. Conversely, to ascertain the engine torque at the current operating point, for instance of the transmission controller, it is not the throttle valve position and engine rpm that are transmitted, from which the transmission controller could ascertain the current engine torque via a matrix stored in memory in the transmission controller; instead the engine controller, via an interface (such as CAN), transmits the current engine torque to the transmission controller.

Figure 3:
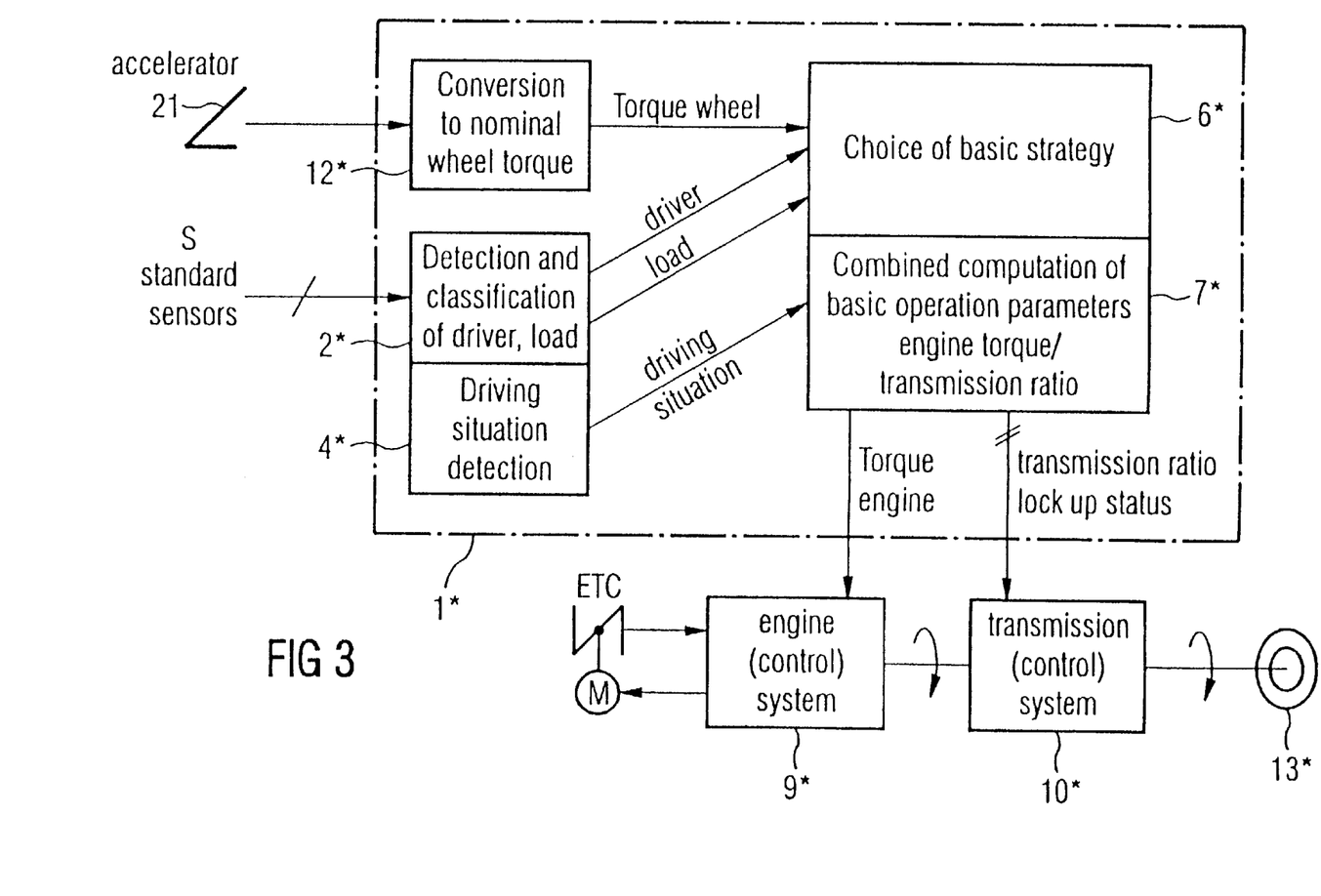
FIG. 3 is a block diagram showing the control of the engine and transmission with another embodiment of the drive train control system.

From FIG. 3, a somewhat simplified integrated drive train control 1 can be seen, which is used to control an internal combustion engine and a transmission. The individual reference numerals correspond to those of FIG. 2 but to distinguish them are followed by an asterisk (*). The function of this drive train control is equivalent to that described above to the extent that the same components are present.

Figure 4:
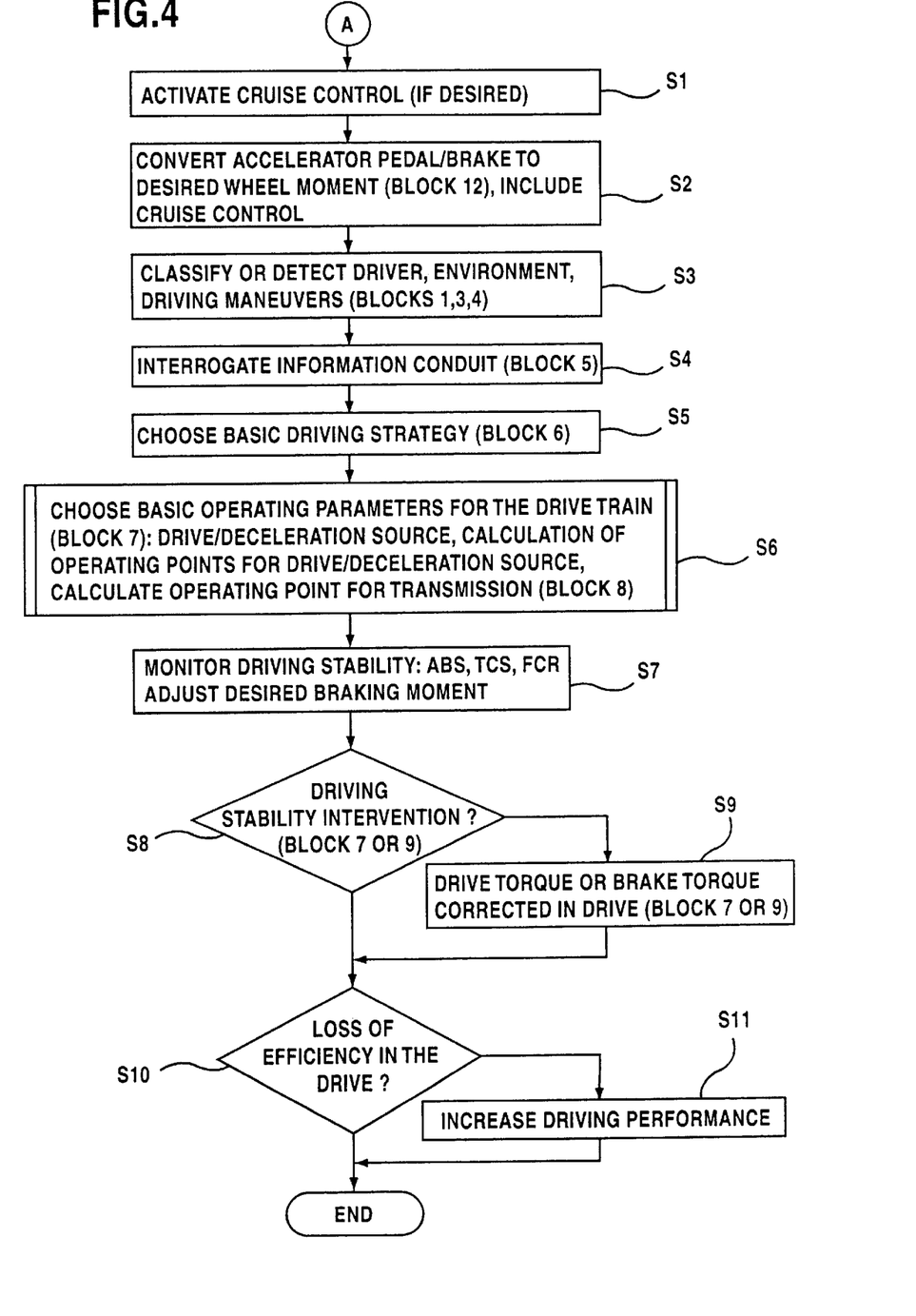
FIG. 4 is a flowchart of the program processed by the drive train control system of FIG. 2.
Figure 5:
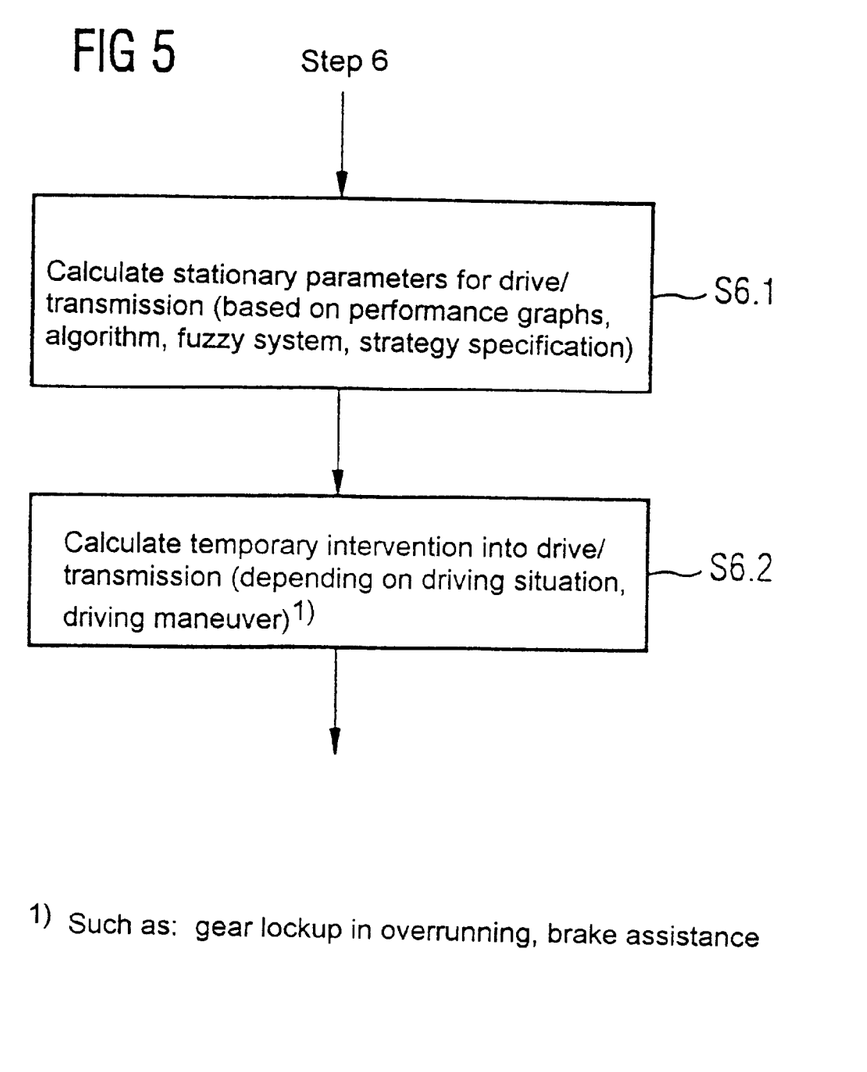
FIG. 5 is a partial flow chart of a subroutine in the process of the flowchart of FIG. 4.

FIGS. 4 and 5 show a flowchart for the sequence performed by the drive train control system 1 of the invention. After the Start A, the program executes the following steps S1–S11:

S1 The cruise control FGR is activated, if desired.

S2 The information on the accelerator pedal—or the brake pedal—is converted into a desired wheel torque (block 12). The cruise control is optionally included.

S3 The driver, environment and driving maneuvers are classified or detected (in blocks 1, 3 and 4).

S4 An inquiry of the information conduit 5 is made (in block 6).

S5 A basic driving strategy is chosen in block 6.

S6 The basic operating parameters for the drive train are chosen (in block 7): the drive or deceleration source, the calculation of operating points of the drive and delay sources, the calculation of the operating point of the transmission (in block 7).

S7 The driving stability is monitored: with ABS, engine performance adjuster TCS, and driving stability controller FSR. The desired braking torque is established.

S8 The question is asked whether a driving stability intervention should be made (in block 7 or 9), if so, then in S9 the drive torque or brake torque is corrected in the drive (block 7 or 9). If not, then in a step S10 The question is asked whether there is a loss of efficiency in the drive train. If so, then in a step S11 The drive performance is increased. After that, and also if the answer is no, the program proceeds to its END Step S6 can also be in the form of a subroutine having the following steps (FIG. 5):

S6.1 The steady-state parameters of the drive and transmission are calculated (based on performance graphs, an algorithm, a fuzzy system, or a strategy specification).

S6.2 A temporary intervention in the drive and the transmission is calculated, specifically as a function of the driving situation and the driving maneuvers, for instance upon gear lockup when overrunning or conditions of brake assist.

The program is subsequently processed to its end as explained in conjunction with FIG. 4.

We claim:

1. A drive train control system for a motor vehicle having an engine, a transmission, wheels, an accelerator pedal, and a brake pedal, the drive train control system comprising:

a calculating device connected to receive position signals representing a position of the accelerator pedal and a position of the brake pedal, said calculating device interpreting the position of the accelerator pedal as one of a wheel torque and a transmission output torque desired by a driver of the motor vehicle independent of transmission and engine-specific parameters and calculating therefrom setpoint values for the engine and the transmission of the motor vehicle;

a classification device connected to receive sensor signals from the drive train, said classification device being programmed to evaluate the sensor signals and to classify operating parameters of the motor vehicle; and said calculating device combining the position signals and the classified operating parameters and generating therefrom central control parameters for drive sources and decelerating units of the drive train of the motor vehicle.

2. The drive train control system according to claim 1, wherein said calculating device is programmed to adjust a transmission ratio in the transmission.

3. The drive train control system according to claim 1, wherein said calculating device is programmed to adjust an engine torque.

4. The drive train control system according to claim 1, wherein said calculating device is programmed to define a type of drive source of the motor vehicle.

5. The drive train control system according to claim 1, wherein the engine is a hybrid drive, and said calculating device is programmed to define and adjust individual operating points of the hybrid drive.

6. The drive train control system according to claim 5, wherein said calculating device is programmed to adjust an engine torque as a function of the transmission ratio of the hybrid drive.

7. The drive train control system according to claim 1, which further comprises:

a selection circuit connected to receive output signals of said classification circuit, said selection circuit selecting a driving strategy based on the output signals of said classification circuit; and decentralized control units connected to receive output signals of said calculating device and of said selection circuit, said decentralized control units generating control signals for the engine, the transmission and a brake system of the motor vehicle.

8. The drive train control according to claim 7, wherein a data exchange among said control units is effected in a torque-based manner.

* * * * *